United States Patent [19]

Watanabe

[11] Patent Number: 4,683,992

[45] Date of Patent: Aug. 4, 1987

[54] VEHICLE SUSPENSION DAMPER WITH REMOTE CONTROL

[75] Inventor: Shunso F. Watanabe, Livonia, Mich.

[73] Assignee: Ford Motor Company, Dearborn, Mich.

[21] Appl. No.: 776,070

[22] Filed: Sep. 13, 1985

[51] Int. Cl.⁴ .............................................. F16F 9/44
[52] U.S. Cl. ................................. 188/299; 188/319; 251/61.3; 251/282
[58] Field of Search ............... 188/299, 318, 319, 279, 188/282, 289, 285; 267/140.1; 251/61.3, 282

[56] References Cited

U.S. PATENT DOCUMENTS

| | | | |
|---|---|---|---|
| 2,592,656 | 4/1952 | Catranis | 188/299 |
| 2,698,068 | 12/1954 | Hein | 188/299 |
| 2,771,248 | 11/1956 | Ehlke | 251/61.3 |
| 3,146,862 | 9/1964 | Van Winsen | 188/279 |
| 3,532,194 | 10/1970 | Jackson | 188/299 |
| 3,827,538 | 8/1974 | Morgan | 188/319 |
| 4,314,585 | 2/1982 | Nishimaya et al. | 251/282 |
| 4,352,487 | 10/1982 | Shtarkman | 267/140.1 X |
| 4,463,839 | 8/1981 | Ashiba | 188/299 |

FOREIGN PATENT DOCUMENTS 2095363  9/1982  United Kingdom ............... 188/319

Primary Examiner—George E. A. Halvosa
Assistant Examiner—M. C. Graham
Attorney, Agent, or Firm—Jerome R. Drouillard; Roger L. May

[57] ABSTRACT

A vehicle suspension damper with remote control includes a fluid controller operatively connected to the damper. The piston assembly of the damper includes a valve driven by a fluid motor receiving pressure signals from the controller.

1 Claim, 5 Drawing Figures

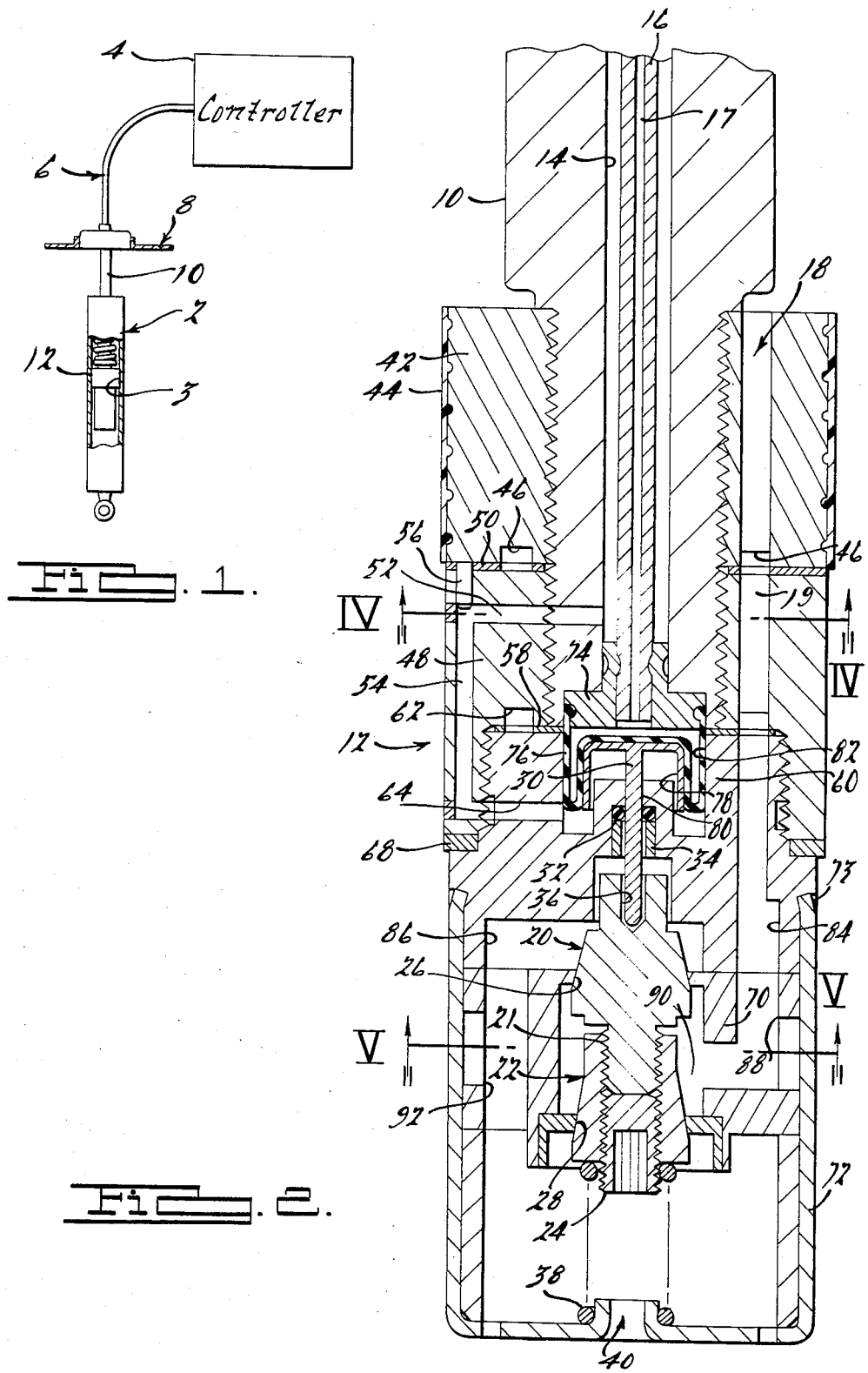

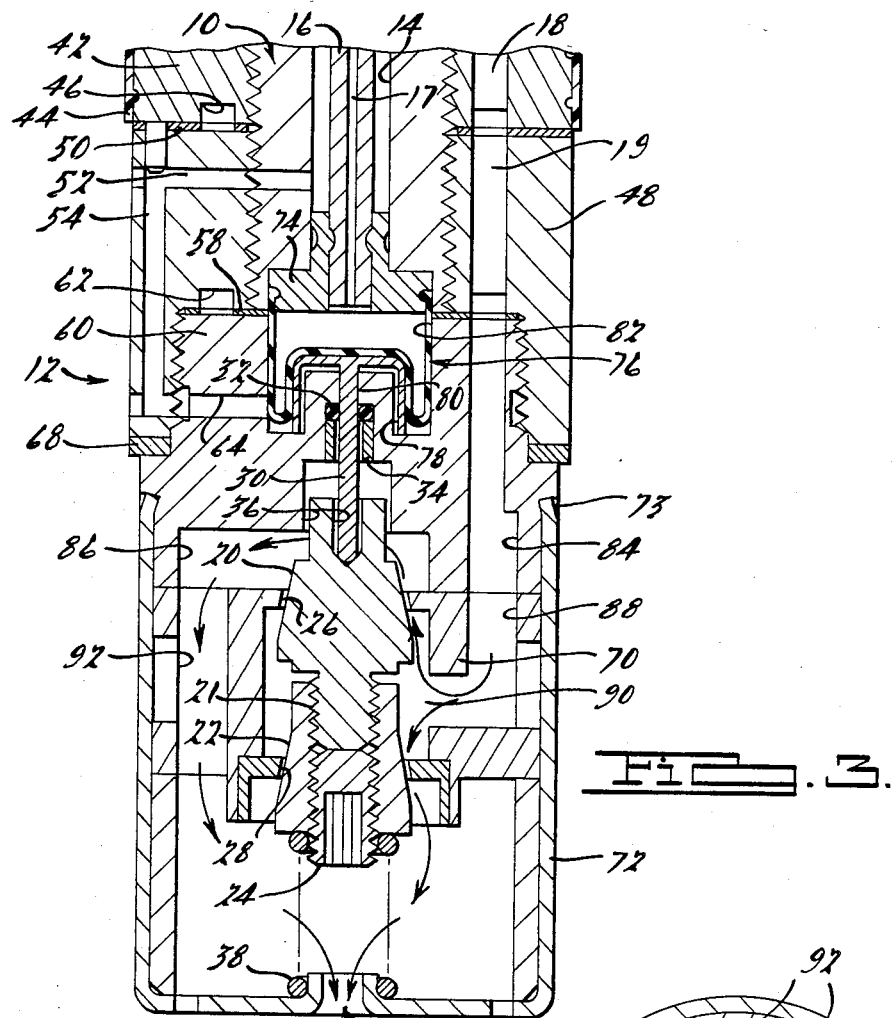
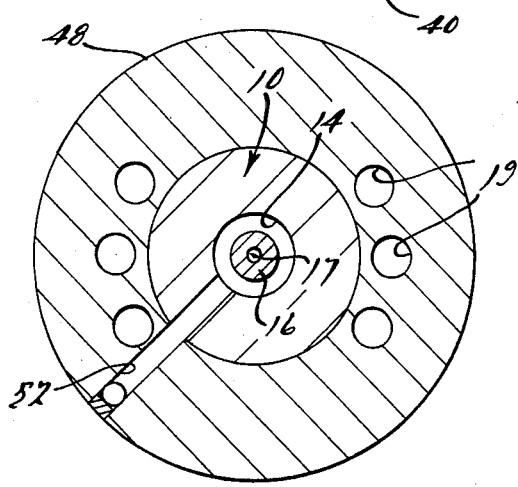
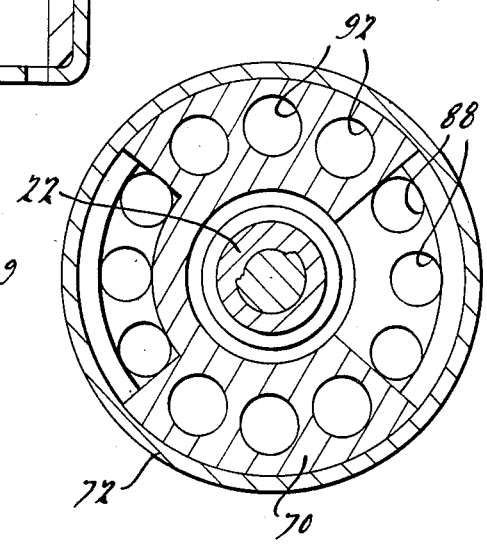

VEHICLE SUSPENSION DAMPER WITH REMOTE CONTROL

BACKGROUND OF THE INVENTION

1. Field of the Invention

This invention relates to a vehicle suspension damper which is remotely controlled.

2. Description of the Prior Art

Vehicle suspension dampers have taken a myriad of forms in the past fifty years. Many types of valving have been proposed as solutions to the long perceived need for better ride control. Although most vehicle suspension dampers stand alone and thus have no external control, remotely controlled devices have been proposed. U.S. Pat. No. 2,698,068, for example, discloses a vehicle "dive arrester" which uses hydraulic brake pressure to lock up a shock absorber whenever the vehicle's service brakes are applied. The brake system pressure acts upon a small piston housed within the shock absorber's main piston to cut off flow through the main piston by displacing the smaller piston. This system is incapable, however, of providing a variable response independent of brake line pressure. Also, no response is possible when the brakes are not actuated.

U.S. Pat. No. 3,146,862 discloses a hydraulic shock absorber having an external piston and cylinder remotely actuatable by hydraulic pressure and coupled by means of a push rod to a spool valve located within the piston rod. The spool valve limits flow through a passageway formed within the piston rod. Because of the weight of the pushrod, piston, and valve, this system is not capable of very low response times.

Other examples of remotely controlled shock absorbers are shown in U.S. Pat. No. 3,532,194 which discloses a vacuum operable variable damping system incorporating an adjustable base valve and U.S. Pat. No. 3,827,538 which discloses a remotely controlled shock absorber having a gear driven valve system including a central control rod running through the piston rod and orifice-containing disk plates adjustable to alter the shock absorber damping characteristics. Finally, U.S. Pat. No. 4,463,839 discloses a shock absorber having a two-position valve operated by a similar central control rod driven by a solenoid motor. These systems could all be expected to suffer from response time problems because, for example, the vacuum operated system would lack the necessary power for fast response, and the gear and solenoid driver system would have hindering inertia resulting from the weight of the moving parts. Additionally, the solenoid-driven system lacks flexibility because the solenoid can be positioned only in discrete locations.

It is an object of the present invention to provide a vehicle suspension damper having variable remotely controllable damping capability.

It is another object of the present invention, then, to provide a damper characterized by low response time.

SUMMARY OF THE INVENTION

The suspension damper of the present invention includes a piston rod with means for receiving pressure signals from a fluid controller and a piston assembly attached to one end of the piston rod. The piston assembly includes a passageway for conducting working fluid through the piston, and means for controlling the flow of the damper's working fluid through the piston, which preferably comprises a fluid motor for receiving pressure signals from the piston rod and an associated valve. The fluid motor is connected with and controls the position of the valve so as to alter the damping characteristics of the unit. The fluid motor comprises a pressure responsive element which may, for example, comprise a diaphragm, and a driven element, such as a hollow cylindrical piston.

BRIEF DESCRIPTION OF THE DRAWINGS

FIG. 1 is a diagrammatic view of a suspension damper according to the present invention showing the component parts of a complete system embodying the invention.

FIG. 2 is a cut-away view of a portion of the damper shown in FIG. 1.

FIG. 3 is a view of a portion of a damper shown in FIG. 2 with the sliding valve shown in an open position.

FIG. 4 is a cross sectional view taken along line IV—IV of FIG. 2.

FIG. 5 is a cross sectional view taken along the line V—V of FIG. 2.

DETAILED DESCRIPTION OF THE PREFERRED EMBODIMENT

As shown in FIG. 1, the motor vehicle suspension damper of the present invention is preferably used with fluid controller 4 connected to the damper by means of tubing or pipe 6. The fluid controller supplies signals via a compressible fluid such as air or some other gas, or by means of an incompressible fluid, such as hydraulic oil. The damper is preferably interposed between the sprung and unsprung portions of a vehicle. Although FIG. 1 shows the damper configured as a shock absorber attached to a vehicle chassis 8 at its upper end, the present invention is equally applicable to a damper comprising the well known MacPherson strut. Those reading this disclosure will understand that the present invention may be employed with yet other tupes of dampers for vehicle suspensions and other purposes. The damper shown includes a piston and piston rod, a pressure cylinder, working fluid, which may, for example, be hydraulic oil, and a fluid controller.

As shown in FIG. 2, the damper of the present invention includes piston rod 10 to which the piston assembly is attached. The piston assembly includes four basic blocks bearing the indentification numerals 42, 48, 60 and 70. Each block is generally cylindrical in shape and contains various passages and ports required for control of the damper's working fluid flow. Piston block 42 is the uppermost of the blocks and is threadedly engaged with piston rod 10. Antifriction sealing band 44 is applied to the outer circumference of piston block 42 and serves to seal the piston assembly against the interior wall of pressure cylinder 3. This band is preferably comprised of a low friction material such as polytetrafluoroethylene. Piston block 42 contains axial passage 18 through which working fluid passes during operation of the damper. Axial passage 18 opens into annular groove 46 formed in the lower face of piston block 42.

Piston block 48 lies below block 42 and is sealed to block 42 by means of seal 50. Piston block 48 is threadedly engaged with piston rod 10. Fluid communication between blocks 42 and 48 is promoted by annular groove 46 formed in piston block 42. Annular groove 46 communicates with a plurality of ports 19 formed in piston block 48. Ports 19 thus form a segment of a continuous axial passage through the piston assembly.

Piston block 48 contains axial passage 54, which is an exhaust passage from the non-pressurized side of fluid motor diaphragm 76. The exhaust passage formed within piston block 48 further comprises radial exhaust passage 64 which lies at the lower extremity of piston block 48 and radial passage 52 lying immediately below the upper extremity of piston block 48. The balance of the exhaust passage is comprised by an annular space formed by axial bore 14 within piston rod 10 and pressure signal supply tube 16 mounted within bore 14. Plug 56 serves to block the upper end of exhaust passage 54 after that passage has been formed, preferably by drilling or boring in piston block 48. The exhaust passage permits pressure signals to be received and freely acted upon by the fluid motor without any restriction from pressurized gases or liquids acting upon the exhaust side of the motor. Usage of the term "exhaust" is not meant to imply that the pressurized fluid supplied to the fluid motor is discharged through the exhaust passage, but rather that any pressure occurring incidentally on the exhaust side of the motor is allowed to discharge through the exhaust passage. Piston block 60 lies under piston block 48 and is threadedly engaged therewith. Seal 58 lies between blocks 48 and 60 creating a fluid tight seal between them. Fluid communication is established between piston blocks 48 and 60 with the aid of annular groove 62 formed in piston block 48. Annular groove 62 thus functions as the termination of ports 19 running through piston block 48. Annular groove 62 communicates working fluid with the series of axial bores 84 formed in piston block 60. Bores 84 communicate with a series of axial passages or bores 88 formed in piston block 70. Piston block 60 also contains cavity 86 which communicates with a series of axial passages 92 contained within piston block 70. Radial exhaust passage 64 is partially contained within piston block 60.

Piston block 70, in addition to containing passages 88 and 92, also has cavity 90 which permits working fluid to flow from bores 88 into the vicinity of first and second poppet sections 20 and 22. Piston block 70 is maintained in contact with piston block 60 by closure spring retainer 72, which is crimped onto piston block 60 by circumferential crimp 73. Those skilled in the art will appreciate that alternative arrangements for the flow passages through the piston will be suggested by the present disclosure.

Flow of the working fluid through the piston assembly of the present invention is controlled by a sliding valve having first and second poppet sections 20 and 22, respectively. The poppet sections are threadedly engaged with each other by threaded section 21 and their combined axial length is controlled by the extent of such threaded engagement. When the proper threaded engagement between the two halves of the sliding valve is reached the halves are locked together by lock screw 24.

The sliding valve is biased against valve seat 26, upon which the second poppet section seats, by compression spring 38. Spring retainer 72 is fitted about piston blocks 60 and 70 and serves to maintain contact between spring 38 and poppet 22. Valve seat 28 is a press fit within piston block 70. The sliding valve is force-balanced. This characteristic obtains because flow impinging upon the valve will urge the poppets in opposite axial directions and with equal force. As a result, vector addition of the forces of the controlled flow against the valve results in no net motive force having a tendency to move the valve. The damper of the present invention therefore is able to respond very quickly to signals from the fluid controller because only the forces of inertia and seal friction need be overcome to move the valve.

The linearly actuatable valve is operated by a fluid motor which includes diaphragm head 74 attached to pressure signal supply tube 16. The balance of the fluid motor is housed within bore 82 formed within piston block 60. Pressure signals transmitted along bore 17 through pressure signal supply tube 16 act upon a pressure responsive element comprising rolling diaphragm 76, which bears upon a driven member comprising cup-shaped piston 78. Pushrod 30 is preferably integral with piston 78 and contacts the sliding valve in the area of pushrod bore 36. Pushrod 30 passes through O-ring seal 32 which prevents working fluid from entering bore 82 in which the fluid motor is housed. Pushrod 30 also passes through sleeve 34 which has the function of retaining push rod O-ring seal 32. Those skilled in the art will appreciate that alternate arrangements for valves and fluid motors will be suggested by this disclosure, those described herein being merely exemplary of the many possibilities for such arrangements. For example, the valve need not be of the poppet design for all dampers constructed according to the present invention. Similarly, the fluid motor need not have the precise construction recited herein because some other form of diaphragm or pressure sensitive element could be employed.

The piston rod and piston assembly of the present invention is characterized by a very low response time to changes in pressure signals applied to bore 17. This low response time results from the close coupling of the fluid motor to the sliding valve as well as from the force balanced design of the sliding valve. Placement of the fluid motor and valve assemblies within the piston permits these components to have very low weight, which materially assists in achieving low response time. As shown in FIG. 3, working fluid moving from, for example, above the piston to below piston will move through passage 18 in piston block 42, passages 19 in piston block 48, passages 84 in piston block 60, passages 88 in piston block 70, and then through cavity 90 in piston block 70, and then through cavity 86 in piston block 60. Flow continues through passages 92 in piston block 70, then through port 40 in spring retainer 72. Flow will also occur between poppet 22 and valve seat 28 and then continue through port 40. Flow in the opposite direction occurs along an identical pathway.

The fluid controller is preferably programmed to modulate the operation of the damper assembly in response to the sensed presence of one or more vehicle operating conditions or parameters detected by one or more sensors. These may include, for example, lateral acceleration encountered during cornering, or laterally acting force resulting from cornering, or vehicle velocity, or steering wheel rotation, or steering gear movement, or any other operating parameter suggested by this disclosure. As an example, the fluid controller could incorporate a pendulum type accelerometer oriented in such a fashion as to detect lateral acceleration. In this example, turning movements of the vehicle producing lateral acceleration in excess of a preset threshold level will be sensed by the accelerometer. A signal from the accelerometer will be received and processed by the fluid controller and a command will issue from the controller requiring the damper to restrict the flow through the piston. This restriction of flow will result in increased damping capability.

The damper assembly of the present invention could be employed in conjuction with a sensor for measuring dynamic axial loading of the damper. As another alternative, a sensor could be used to measure the axial acceleration of the piston assembly or some other variable. In either case, the damping rate could be adjusted to meet the dynamic requirements of the vehicle into which the damper is incorporated. The fluid motor permits precise positioning of the valve, which allows equally precise adjustment of the damping produced by the system of the present invention.

It is understood that my invention is not limited to the specific embodiment shown and that various deviations may be made therefrom without departing from the spirit and scope of the appended claims.

I claim:

1. A vehicle suspension damper comprising:
 a pressure cylinder and a piston assembly comprising a piston and piston rod;
 working fluid within said pressure cylinder;
 a passageway through said piston for allowing said working fluid to pass from one side of said piston to the other side of said piston;
 a linearly actuatable valve within said piston for controlling the flow of fluid through said passageway, said valve comprising a double-headed poppet which is force-balanced with respect to the flow of fluid acting upon the valve by the flow of fluid impinging upon the valve urging each poppet of the double-headed poppet in opposite axial directions with equal force;
 a fluid motor within said piston for controlling said valve, with said motor comprising a pressure responsive rolling diaphragm and a cup-shaped cylindrical piston driven by said rolling diaphragm; and
 an axial passage through said piston rod for communicating pressure signals from a fluid controller to said fluid motor whereby the damper is able to respond very quickly to signals from the fluid controller because only inertial forces and friction need be overcome to move the valve.

* * * * *